(12) United States Patent
Nishi

(10) Patent No.: US 10,934,688 B2
(45) Date of Patent: Mar. 2, 2021

(54) SHOVEL

(71) Applicant: SUMITOMO(S.H.I.) CONSTRUCTION MACHINERY CO., LTD., Tokyo (JP)

(72) Inventor: Takashi Nishi, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/142,221

(22) Filed: Sep. 26, 2018

(65) Prior Publication Data

US 2019/0024346 A1    Jan. 24, 2019

Related U.S. Application Data

(63) Continuation of application No. PCT/JP2017/013328, filed on Mar. 30, 2017.

(30) Foreign Application Priority Data

Mar. 31, 2016  (JP) ................ 2016-071608

(51) Int. Cl.
   *E02F 9/26*       (2006.01)
   *E02F 3/32*       (2006.01)
   *B60R 1/00*       (2006.01)

(52) U.S. Cl.
   CPC ............... *E02F 9/264* (2013.01); *E02F 3/32* (2013.01); *B60R 1/00* (2013.01); *B60R 2300/105* (2013.01); *B60R 2300/30* (2013.01)

(58) Field of Classification Search
   CPC .... E02F 9/264; E02F 3/32; B60R 1/00; B60R 2300/105; B60R 2300/30
   See application file for complete search history.

(56) References Cited

U.S. PATENT DOCUMENTS

| 5,854,988 A | 12/1998 | Davidson et al. |
| 7,369,978 B1* | 5/2008 | Hagenbuch ............. G06T 19/00 703/8 |
| 7,412,357 B1* | 8/2008 | Hagenbuch ............. G06F 30/15 703/1 |
| 7,532,967 B2 | 5/2009 | Fujishima et al. |

(Continued)

FOREIGN PATENT DOCUMENTS

| DE | 112012000290 | 8/2014 |
| EP | 0682786 | 11/1995 |

(Continued)

OTHER PUBLICATIONS

International Search Report for PCT/JP2017/013328 dated May 23, 2017.

*Primary Examiner* — Rufus C Point
(74) *Attorney, Agent, or Firm* — Ipusa, PLLC

(57) ABSTRACT

A shovel includes a traveling undercarriage, an upper rotating structure swingably mounted on the traveling undercarriage, an attachment attached to the upper rotating structure and including a boom, an arm, and an end attachment, and a display device. The display device is configured to display the attitude information of the end attachment in a three-dimensional model that enables three-dimensional visual recognition of the attitude information. The three-dimensional model is displayed in accordance with the attitude of the end attachment.

12 Claims, 12 Drawing Sheets

(56) References Cited

U.S. PATENT DOCUMENTS

| | | | |
|---|---|---|---|
| 9,540,786 B2 | 1/2017 | Ogawa | |
| 9,650,755 B2 | 5/2017 | Nomura et al. | |
| 10,017,919 B2 | 7/2018 | Nomura et al. | |
| 2014/0100712 A1 | 4/2014 | Nomura et al. | |
| 2014/0100744 A1* | 4/2014 | Johnson | G01S 19/48 |
| | | | 701/50 |
| 2014/0188333 A1 | 7/2014 | Friend | |
| 2015/0276468 A1* | 10/2015 | Jaeger | G01G 19/08 |
| | | | 382/154 |
| 2016/0125666 A1 | 5/2016 | Izumikawa et al. | |
| 2016/0186410 A1* | 6/2016 | Shioji | E02F 9/16 |
| | | | 296/190.1 |
| 2016/0230553 A1* | 8/2016 | Kuramoto | E21D 9/108 |
| 2016/0289928 A1* | 10/2016 | Kitajima | E02F 3/3677 |
| 2017/0114526 A1* | 4/2017 | Yasuda | E02F 9/264 |
| 2017/0175362 A1* | 6/2017 | Iwanaga | G01S 19/43 |
| 2018/0051446 A1* | 2/2018 | Yoshinada | B60R 1/00 |
| 2019/0161942 A1* | 5/2019 | Hokkanen | G06F 3/011 |
| 2019/0387219 A1* | 12/2019 | Kondo | G05D 1/0038 |
| 2020/0242829 A1* | 7/2020 | Cheng | G06T 15/08 |

FOREIGN PATENT DOCUMENTS

| | | |
|---|---|---|
| EP | 2778293 | 9/2014 |
| JP | 2004-027830 | 1/2004 |
| JP | 2004-107926 | 4/2004 |
| JP | 2007-150536 | 6/2007 |
| JP | 2013-036243 | 2/2013 |
| JP | 2013-113044 | 6/2013 |
| JP | 2014-074319 | 4/2014 |
| JP | 2014-177784 | 9/2014 |
| JP | 2014-205955 | 10/2014 |
| JP | 2015-021258 | 2/2015 |

\* cited by examiner

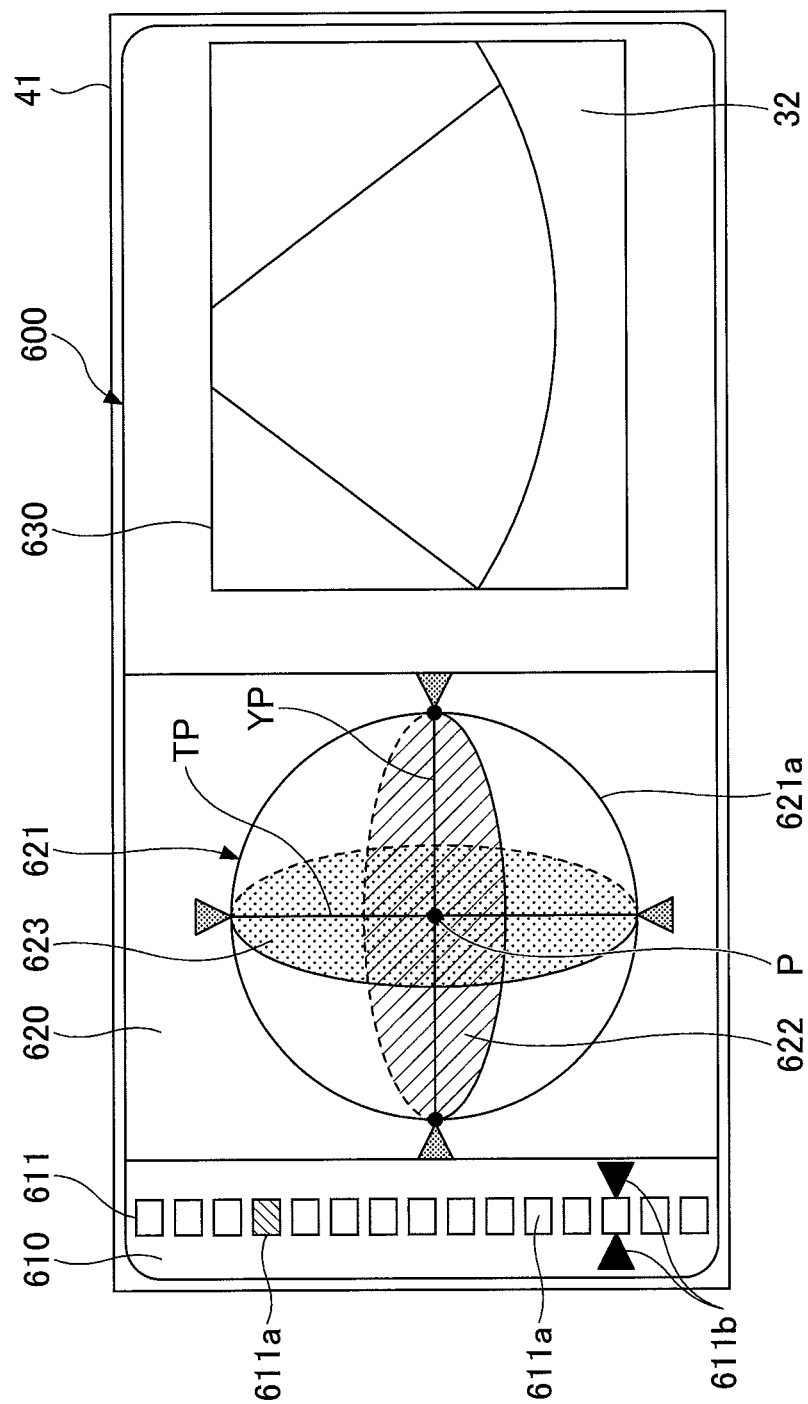

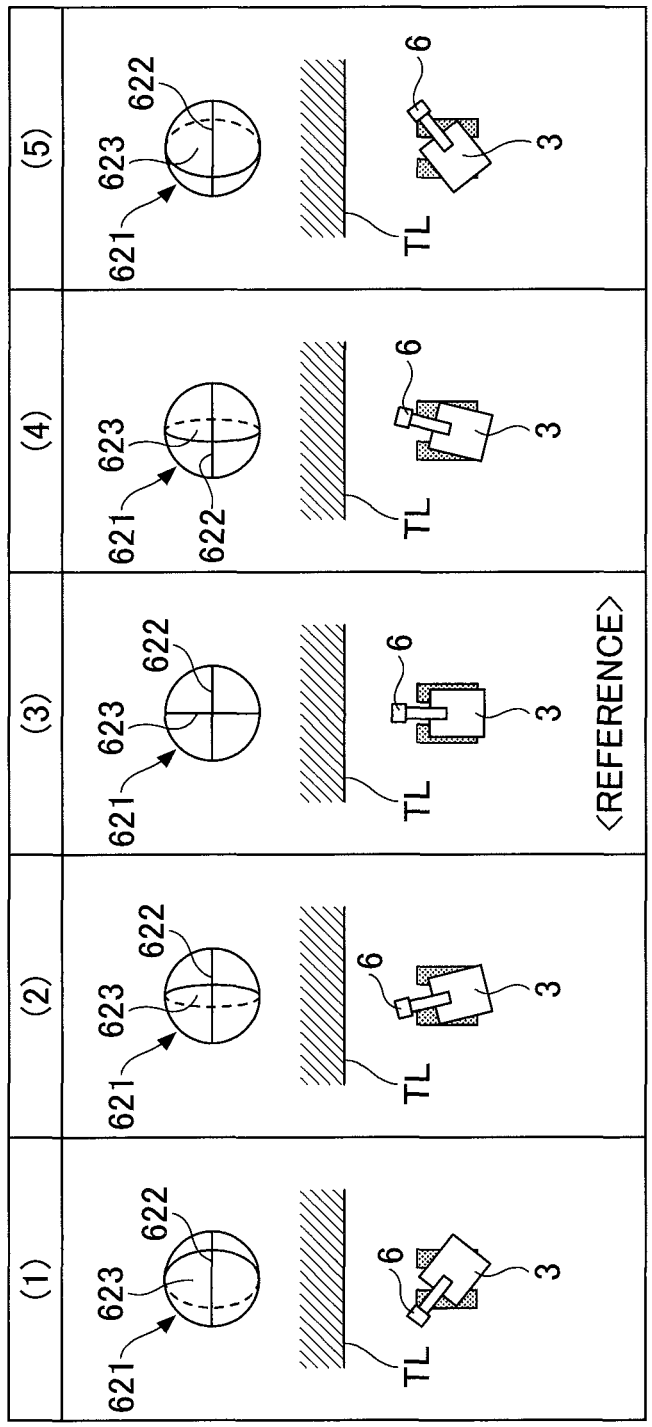

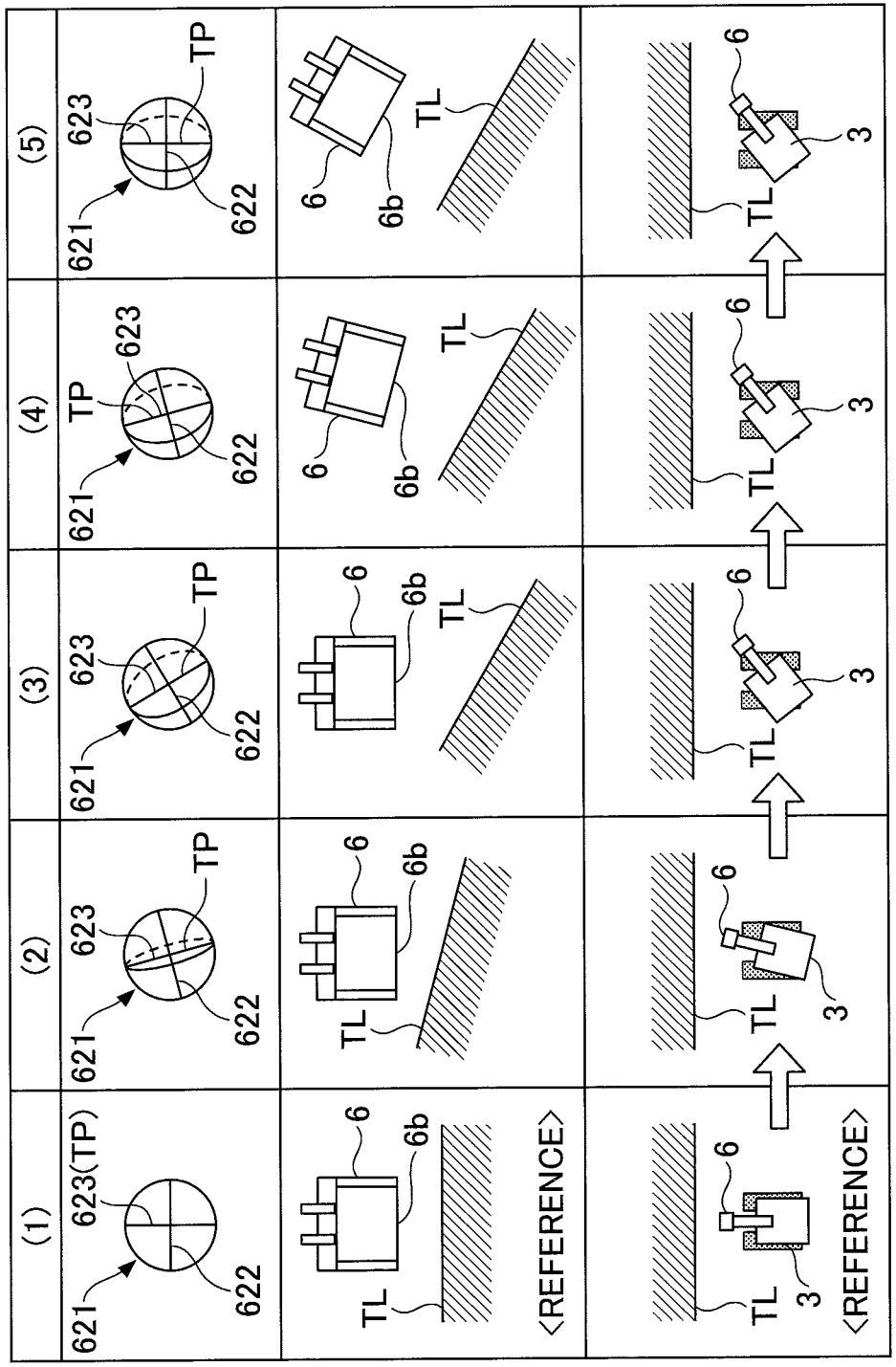

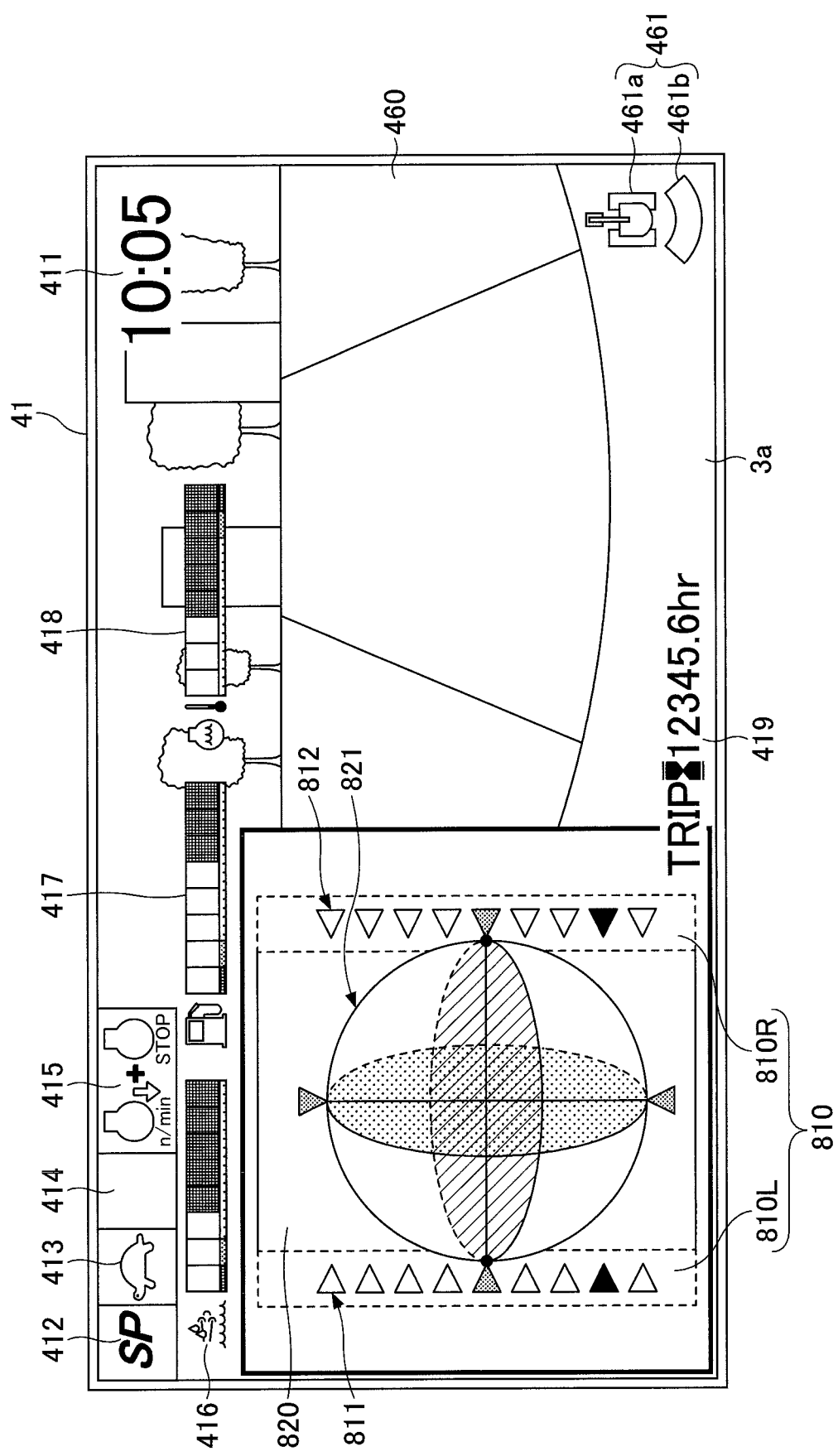

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2017/013328, filed on Mar. 30, 2017 and designating the U.S., which claims priority to Japanese patent application No. 2016-071608, filed on Mar. 31, 2016. The entire contents of the foregoing applications are incorporated herein by reference.

BACKGROUND

Technical Field

The present invention relates to shovels.

Description of Related Art

According to shovels with a machine guidance function, for example, the relative distance of a bucket to a target surface is two-dimensionally displayed on the screen of a display device installed diagonally in front of an operator seat.

SUMMARY

According to an aspect of the present invention, a shovel includes a traveling undercarriage, an upper rotating structure swingably mounted on the traveling undercarriage, an attachment attached to the upper rotating structure and including a boom, an arm, and an end attachment, and a display device. The display device is configured to display the attitude information of the end attachment in a three-dimensional model that enables three-dimensional visual recognition of the attitude information. The three-dimensional model is displayed in accordance with the attitude of the end attachment.

BRIEF DESCRIPTION OF THE DRAWINGS

FIG. 6 is a diagram illustrating an example display on a display screen;

FIG. 7B is a diagram illustrating a list of example displays corresponding to the attitudes of the bucket and the upper rotating structure;

FIG. 8B is a diagram illustrating different example displays on the display screen;

FIG. 10 is a diagram illustrating another example of an image displayed on an image display part.

DETAILED DESCRIPTION

According to the above-described shovel, the relative distance of the bucket to the target surface is displayed in multiple forms of display such as a side view of the bucket, a front view of the bucket, etc. When display is performed in multiple forms, however, it is difficult for an operator to intuitively understand the attitude of the bucket.

A shovel operator normally performs work while looking at the tips of teeth of a bucket or an excavation site positioned in front of an operator seat, and therefore, cannot look at a display device for a long time during work. Accordingly, the shovel operator can look at the display device for an extremely short time during work, and may have difficulty in checking desired information from an image displayed on the display device within the time.

According to an embodiment of the present invention, a shovel including a display device that allows an operator to accurately and intuitively understand the attitude of a bucket without concentrating on a display screen is provided.

According to an aspect of the present invention, an operator can accurately and intuitively understand the attitude of a bucket without concentrating on a display screen.

One or more embodiments of the present invention are described with reference to the accompanying drawings.

Figure 1:
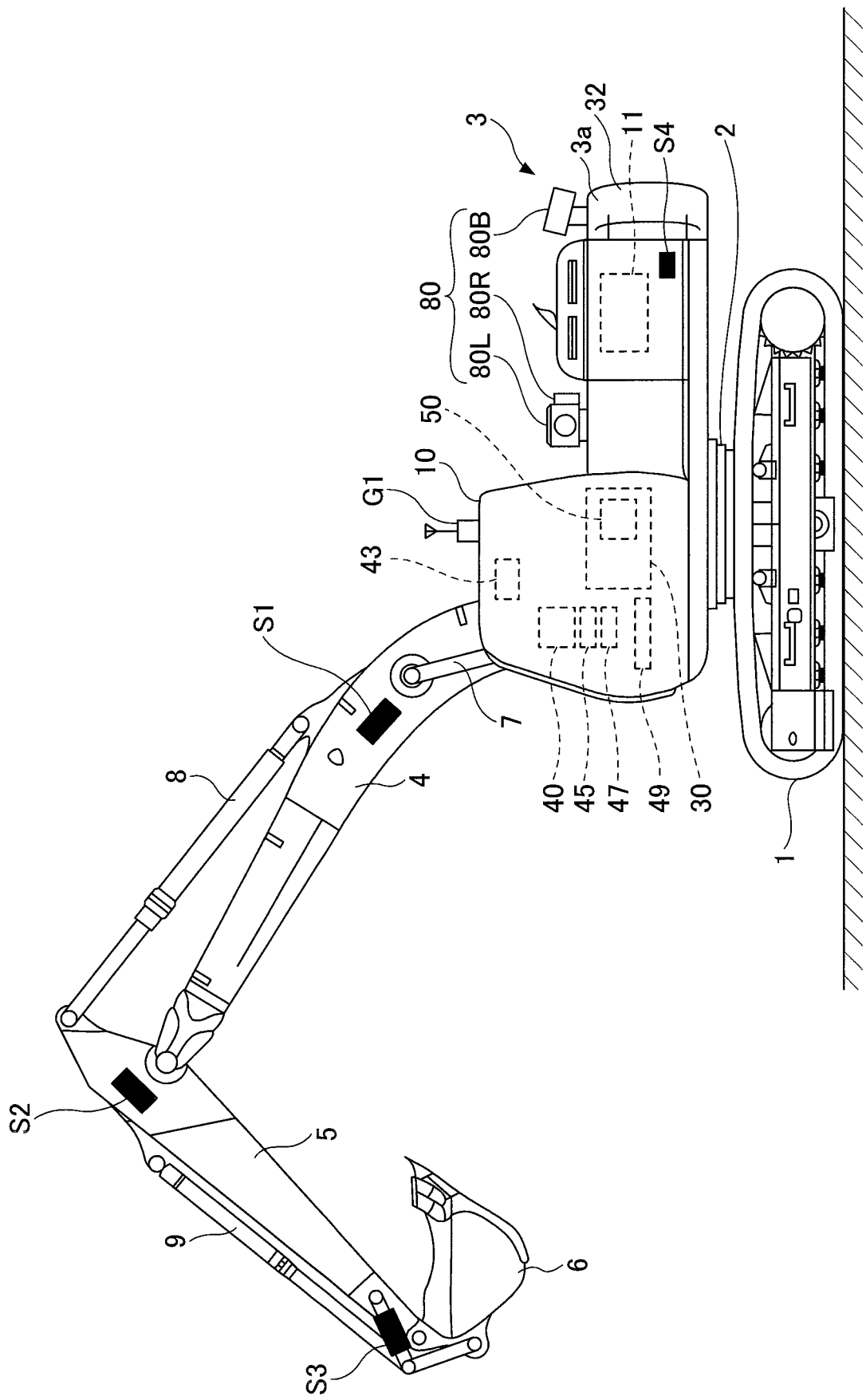
FIG. 1 is a side view illustrating a shovel according to an embodiment.

FIG. 1 is a side view illustrating a shovel according to an embodiment.

An upper rotating structure 3 is mounted on a traveling undercarriage 1 of the shovel via a swing mechanism 2. A boom 4 is attached to the upper rotating structure 3. An arm 5 is attached to an end of the boom 4. A bucket 6 serving as an end attachment (a working part) is attached to an end of the arm 5. A slope bucket, a dredging bucket, a breaker or the like may alternatively be attached as an end attachment.

The boom 4, the arm 5, and the bucket 6 form an excavation attachment as an example of an attachment, and are hydraulically driven by a boom cylinder 7, an arm cylinder 8, and a bucket cylinder 9, respectively. A boom angle sensor S1 is attached to the boom 4. An arm angle sensor S2 is attached to the arm 5. A bucket angle sensor S3 is attached to the bucket 6. A bucket tilt mechanism may be provided on the excavation attachment.

The boom angle sensor S1 detects the rotation angle of the boom 4. For example, the boom angle sensor S1 is an acceleration sensor that detects the rotation angle of the boom 4 relative to the upper rotating structure 3 by detecting an inclination to a transverse plane.

The arm angle sensor S2 detects the rotation angle of the arm 5. For example, the arm angle sensor S2 is an acceleration sensor that detects the rotation angle of the arm 5 relative to the boom 4 by detecting an inclination to a transverse plane.

The bucket angle sensor S3 detects the rotation angle of the bucket 6. For example, the bucket angle sensor S3 is an acceleration sensor that detects the rotation angle of the bucket 6 relative to the arm 5 by detecting an inclination to a transverse plane.

When the excavation attachment is provided with a bucket tilt mechanism, the bucket angle sensor S3 additionally detects the rotation angle of the bucket 6 about a tilt axis. The boom angle sensor S1, the arm angle sensor S2, and the bucket angle sensor S3 may alternatively be potentiometers using a variable resistor, stroke sensors that detect the stroke amount of a corresponding hydraulic cylinder, or rotary encoders that detect a rotation angle about a connecting pin, or may be formed of a combination of an acceleration sensor and a gyro sensor.

Power sources such as an engine 11, a counterweight 32, and a body tilt sensor S4 are mounted on the upper rotating structure 3 and covered with a cover 3*a*. The counterweight 32 serves to counterbalance the weight of the attachment. The body tilt sensor S4 detects the tilt angle of the upper rotating structure 3. For example, the body tilt sensor S4 is an acceleration sensor that detects the tilt angle of the upper rotating structure 3 by detecting an inclination to a transverse plane.

An image capturing unit 80 is provided on top of the cover 3*a*. The image capturing unit 80 includes, facing a cabin 10 from the upper rotating structure 3, a left-side camera 80L that captures an image on the left side, a right-side camera 80R that captures an image on the right side, and a back-side camera 80B that captures an image on the back side. The left-side camera 80L, the right-side camera 80R, and the back-side camera 80B are, for example, digital cameras that contain an imaging device such as a CCD or CMOS, and transmit respective captured images to a display device 40 provided in the cabin 10.

The cabin 10, serving as a cab, is provided on the upper rotating structure 3. A GPS device (a GNSS receiver) G1 is provided on top of the cabin 10. The GPS device G1 detects the position of the shovel using a GPS function, and feeds position data to a machine guidance device 50 in a controller 30. The controller 30, the display device 40, an audio output device 43, an input device 45, and a storage device 47 are provided in the cabin 10.

The controller 30 operates as a main control part to control the driving of the shovel. The controller 30 is composed of a processing unit including a CPU and an internal memory. The CPU executes a program stored in the internal memory to implement various functions of the controller 30.

The controller 30 also operates as the machine guidance device 50 to guide shovel operations. For example, the machine guidance device 50 notifies an operator of work information such as the distance between a target surface that is the surface of a target terrain set by the operator and the end attachment and the relative angle of the end attachment to the target surface. The distance between the target surface and the end attachment is, for example, the distance between the target surface, and the end (teeth tips) of the bucket 6 as the end attachment and the back surface of the bucket 6. The machine guidance device 50 notifies the operator of work information through the display device 40, the audio output device 43, etc., to guide shovel operations. The work information includes information on the distance between the target surface and the end attachment and attitude information indicating the relative angle of the end attachment to the target surface. While the machine guidance device 50 is incorporated into the controller 30 according to this embodiment, the machine guidance device 50 and the controller 30 may alternatively be provided separately. In this case, like the controller 30, the machine guidance device 50 is composed of a processing unit including a CPU and an internal memory. The CPU executes a program stored in the internal memory to implement various functions of the machine guidance device 50.

The display device 40 displays an image including various kinds of work information in response to a command from the machine guidance device 50 included in the controller 30. The display device 40 is, for example, an in-vehicle liquid crystal display connected to the machine guidance device 50.

The audio output device 43 outputs various kinds of audio information in response to an audio output command from the machine guidance device 50 included in the controller 30. The audio output device 43 includes, for example, an in-vehicle speaker connected to the machine guidance device 50. The audio output device 43 may include an alarm such as a buzzer.

The input device 45 is a device for inputting various kinds of information to the controller 30 including the machine guidance device 50 by the operator of the shovel. The input device 45 includes, for example, a membrane switch provided on the surface of the display device 40. The input device 45 may include a touchscreen or the like.

The storage device 47 is a device for storing various kinds of information. The storage device 47 is, for example, a non-volatile storage medium such as a semiconductor memory. The storage device 47 stores various kinds of information output by the controller 30 including the machine guidance device 50, etc.

A gate lock lever 49 is a mechanism provided between the door and the operator seat of the cabin 10 to prevent the shovel from being accidentally operated. When the operator climbs onto the operator seat and pulls up the gate lock lever 49, the operator is prevented from getting out of the cabin 10 and various operating apparatuses become operable. When the operator pushes down the gate lock lever 49, the operator can get out of the cabin 10 and various operating apparatuses become inoperable.

Figure 2:
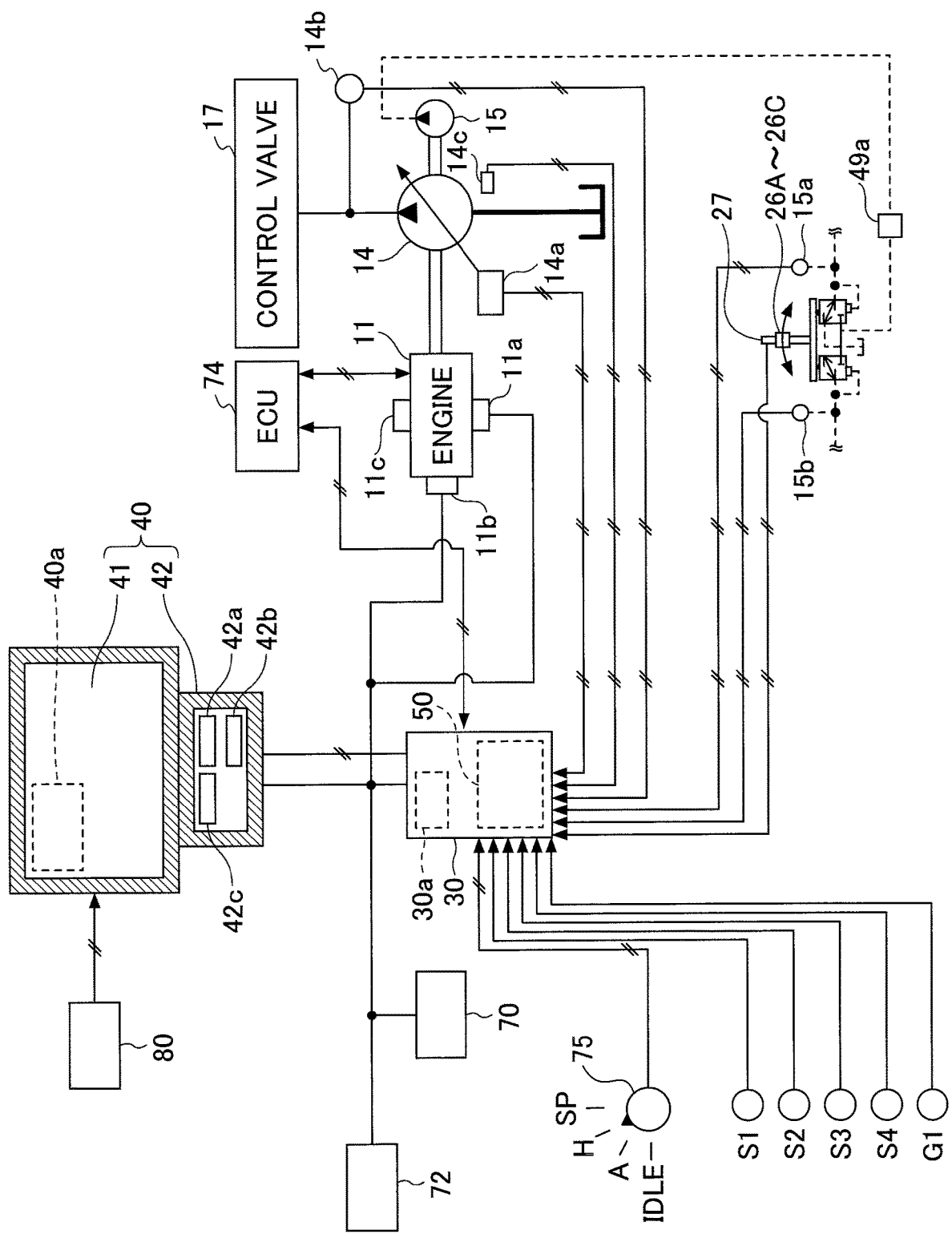
FIG. 2 is a diagram illustrating a configuration of connections including a controller of the shovel.

FIG. 2 is a diagram illustrating a configuration of connections including the controller 30 of the shovel according to the embodiment.

The display device 40 is provided in the cabin 10 to display an image including work information fed from the machine guidance device 50, etc. The display device 40 is connected to the controller 30 including the machine guidance device 50 via a communications network such as a Controller Area Network (CAN) or a Local Interconnect Network (LIN), a dedicated line, etc.

The display device 40 includes a conversion part 40*a* to generate an image to be displayed on an image display part 41. The conversion part 40*a* generates an image including captured images to be displayed on the image display part 41, based on image data obtained from the image capturing unit 80. Image data are input to the display device 40 from each of the left-side camera 80L, the right-side camera 80R, and the back-side camera 80B.

Furthermore, the conversion part 40*a* converts, into an image signal, data to be displayed on the image display part 41 among various kinds of data input to the display device 40 from the controller 30. The data input to the display device 40 from the controller 30 include, for example, data indicating the temperature of engine coolant water, data indicating the temperature of hydraulic oil, data indicating the remaining amount of an aqueous urea solution, data indicating the remaining amount of fuel, etc.

The conversion part 40*a* outputs an image signal after conversion to the image display part 41 to display an image generated based on captured images and various kinds of data on the image display part 41.

The conversion part 40*a* may be provided in not the display device 40 but, for example, the controller 30. In this case, the image capturing unit 80 is connected to the controller 30.

The display device 40 includes a switch panel 42 serving as an input part. The switch panel 42 is a panel including various kinds of hardware switches. The switch panel 42 includes a light switch 42a, a windshield wiper switch 42b, and a window washer switch 42c.

The light switch 42a is a switch for turning on and off lights attached to the exterior of the cabin 10. The windshield wiper switch 42b is a switch for moving and stopping a windshield wiper. The window washer switch 42c is a switch for spraying windshield washer fluid.

The display device 40 is supplied with electric power from a rechargeable battery 70 to operate. The rechargeable battery 70 is charged with electric power generated in an alternator 11a (generator) of the engine 11. The electric power of the rechargeable battery 70 is also supplied to electrical equipment 72, etc., of the shovel besides the controller 30 and the display device 40. Furthermore, a starter 11b of the engine 11 is driven with electric power from the rechargeable battery 70 to start the engine 11.

The engine 11 is connected to a main pump 14 and a pilot pump 15, and is controlled by an engine control unit (ECU) 74. Various data indicating the condition of the engine 11 (for example, data indicating coolant water temperature (a physical quantity) detected with a water temperature sensor 11c, etc.) are constantly transmitted from the ECU 74 to the controller 30. The controller 30 can store these data in an internal temporary storage part (memory) 30a and suitably transmit the data to the display device 40.

The main pump 14 is a hydraulic pump for supplying hydraulic oil to a control valve 17 via a high-pressure hydraulic line. The main pump 14 is, for example, a swash-plate variable displacement hydraulic pump.

The pilot pump 15 is a hydraulic pump for supplying hydraulic oil to various hydraulic control apparatuses via a pilot line. The pilot pump 15 is, for example, a fixed displacement hydraulic pump.

The control valve 17 is a hydraulic controller to control the hydraulic system of the shovel. For example, the control valve 17 selectively supplies hydraulic oil discharged by the main pump 14 to the boom cylinder 7, the arm cylinder 8, the bucket cylinder 9, traveling hydraulic motors, a swing hydraulic motor, etc. In the following, the boom cylinder 7, the arm cylinder 8, the bucket cylinder 9, the traveling hydraulic motors, and the swing hydraulic motor may be referred to as "hydraulic actuators."

Operating levers 26A through 26C are provided in the cabin 10 to be used by the operator to operate hydraulic actuators. When the operating levers 26A through 26C are operated, hydraulic oil is supplied from the pilot pump 15 to the pilot ports of flow control valves corresponding to hydraulic actuators. Each pilot port is supplied with hydraulic oil of a pressure commensurate with the direction of operation and the amount of operation of a corresponding one of the operating levers 26A through 26C.

According to this embodiment, the operating lever 26A is a boom operating lever. The operator can hydraulically drive the boom cylinder 7 to operate the boom 4 when operating the operating lever 26A. The operating lever 26B is an arm operating lever. The operator can hydraulically drive the arm cylinder 8 to operate the arm 5 when operating the operating lever 26B. The operating lever 26C is a bucket operating lever. The operator can hydraulically drive the bucket cylinder 9 to operate the bucket 6 when operating the operating lever 26C. Besides the operating levers 26A through 26C, operating levers, operating pedals, etc., for driving the traveling hydraulic motors, the swing hydraulic motor, etc., may be provided in the shovel.

The controller 30 obtains, for example, various kinds of data described below. The data obtained by the controller 30 are stored in the temporary storage part 30a. A regulator 14a of the main pump 14, which is a variable displacement hydraulic pump, transmits data indicating a swash plate angle to the controller 30. Furthermore, a discharge pressure sensor 14b transmits data indicating the discharge pressure of the main pump 14 to the controller 30. These data (data representing physical quantities) are stored in the temporary storage part 30a. Furthermore, an oil temperature sensor 14c provided in a conduit between the main pump 14 and a tank storing hydraulic oil that the main pump 14 draws in transmits data representing the temperature of hydraulic oil flowing through the conduit to the controller 30.

Pressure sensors 15a and 15b detect a pilot pressure transmitted to the control valve 17 when the operating levers 26A through 26C are operated, and transmit data indicating the detected pilot pressure to the controller 30. The operating levers 26A through 26C are provided with a switch button 27. The operator can transmit a command signal to the controller 30 by operating the switch button 27 while operating the operating levers 26A through 26C.

An engine rotational speed adjustment dial 75 is provided in the cabin 10 of the shovel. The engine rotational speed adjustment dial 75 is a dial for adjusting the rotational speed of the engine 11, and, for example, can switch the engine rotational speed in a stepwise manner. According to this embodiment, the engine rotational speed adjustment dial 75 is provided to make it possible to switch the engine rotational speed among the four levels of SP mode, H mode, A mode, and idling mode. The engine rotational speed adjustment dial 75 transmits data indicating the setting of the engine rotational speed to the controller 30. FIG. 2 illustrates a state where the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel with low noise while prioritizing fuel efficiency, and uses the third highest engine rotational speed. The idling mode is a rotational speed mode selected when it is desired to idle the engine 11, and uses the lowest engine rotational speed. The engine 11 is controlled to a constant rotational speed at the engine rotational speed of the rotational speed mode set by the engine rotational speed adjustment dial 75.

Figure 3:
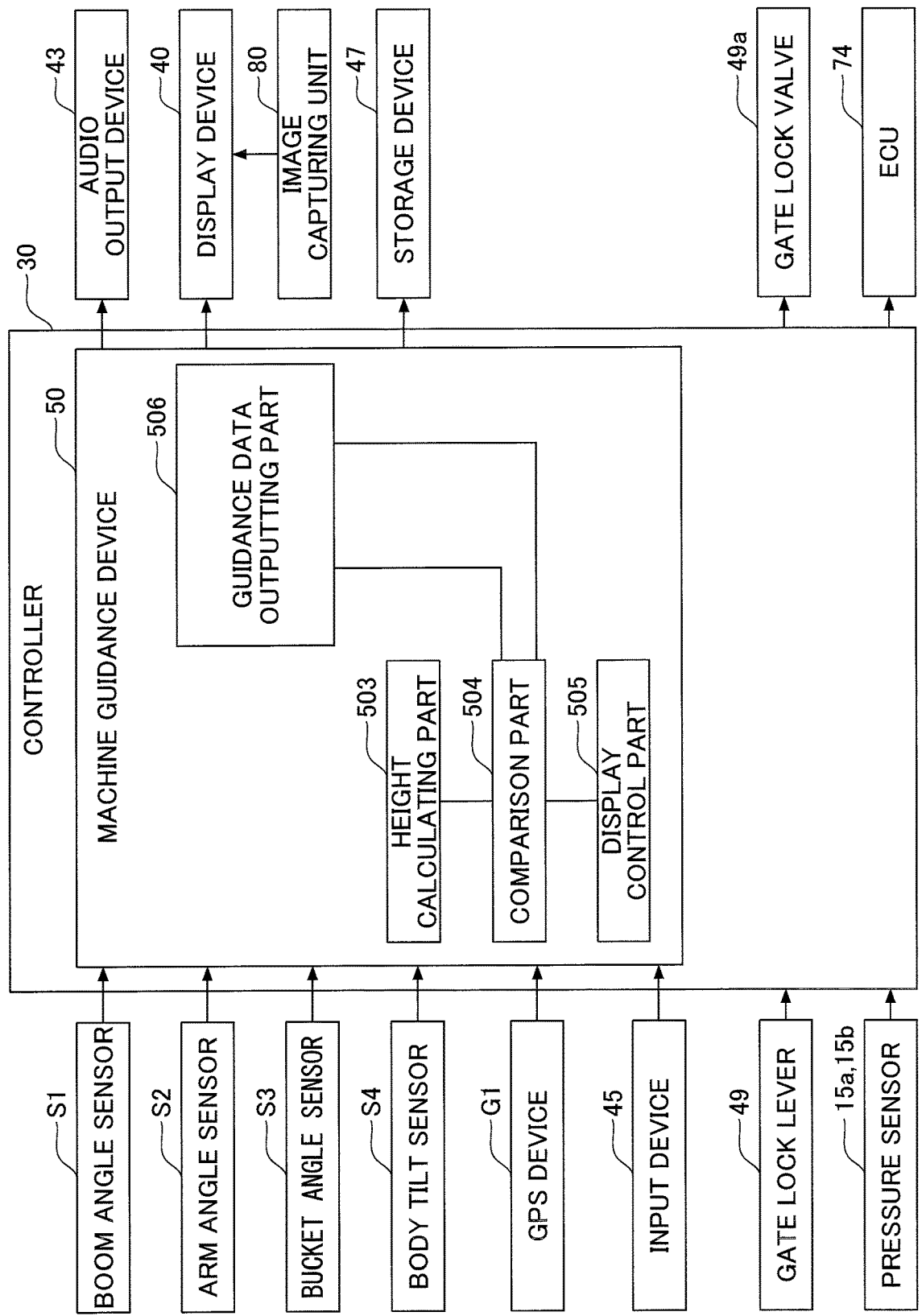
FIG. 3 is a diagram illustrating a configuration of the controller and a machine guidance device.

Next, various functions provided in the controller 30 and the machine guidance device 50 of the shovel are described. FIG. 3 is a diagram illustrating a configuration of the controller 30 and the machine guidance device 50 according to the embodiment.

The controller 30 controls the operation of the entire shovel including the ECU 74. The controller 30 performs control to close a gate lock valve 49a when the gate lock lever 49 is pushed down and to open the gate lock valve 49a when the gate lock lever 49 is pulled up. The gate lock valve 49a is a selector valve provided in an oil passage between the control valve 17 and the operating levers 26A through 26C, etc. Here, the gate lock valve 49a is configured to be opened or closed based on a command from the controller 30. Alternatively, the gate lock valve 49a may be mechanically connected to the gate lock lever 49 to be opened or closed in response to the operation of the gate lock lever 49.

The gate lock valve 49*a* is closed to interrupt a flow of hydraulic oil between the control valve 17 and the operating levers 26A through 26C, etc., to disable the operating levers 26A through 26C, etc. The gate lock valve 49*a* is opened to allow passage of hydraulic oil between the control valve 17 and the operating levers 26A through 26C, etc., to enable the operating levers 26A through 26C, etc.

The controller 30 detects the amount of operation of each lever from a pilot pressure detected by the pressure sensor 15*a* or 15*b* with the gate lock valve 49*a* being opened to have the operating levers 26A through 26*c* enabled.

In addition to controlling the operation of the entire shovel, the controller 30 controls whether to give guidance by the machine guidance device 50. Specifically, in response to determining that the shovel is not working, the controller 30 transmits a guidance stop command to the machine guidance device 50 to stop guidance by the machine guidance device 50.

The controller 30 may output a guidance stop command to the machine guidance device 50 when outputting an automatic idling stop command to the ECU 74. Alternatively, the controller 30 may output a guidance stop command to the machine guidance device 50 in response to determining that the gate lock lever 49 is pushed down.

Next, the machine guidance device 50 is described. The machine guidance device 50 receives various signals and data supplied to the controller 30, from the boom angle sensor S1, the arm angle sensor S2, the bucket angle sensor S3, the body tilt sensor S4, the GPS device G1, the input device 45, etc.

Information pertaining to the shape of the bucket 6 is input to the input device 45 to be output to the controller 30. The information pertaining to the shape of the bucket 6 includes information such as the opening height and the opening width, the distance from the teeth tips to the back surface, the teeth length, etc., of the bucket 6.

The machine guidance device 50 calculates the actual operating position of the attachment such as the bucket 6 based on the received signals and data. Then, the machine guidance device 50 compares the actual operating position of the attachment and the target surface, and calculates, for example, the distance between the bucket 6 and the target surface and the relative angle of the bucket 6 to the target surface. The machine guidance device 50 also calculates the distance from the swing center axis of the shovel to the teeth ends of the bucket 6, the inclination angle of the target surface, etc., and transmits these to the display device 40 as work information.

When the machine guidance device 50 and the controller 30 are provided separately, the machine guidance device 50 and the controller 30 are connected through CAN (Controller Area Network) to be able to communicate with each other.

The machine guidance device 50 includes a height calculating part 503, a comparison part 504, a display control part 505, and a guidance data outputting part 506.

The height calculating part 503 calculates the height of the end (teeth tips) of the bucket 6 from the angles of the boom 4, the arm 5, and the bucket 6 determined from the detection signals of the boom angle sensor S1, the arm angle sensor S2, and the bucket angle sensor S3.

The comparison part 504 compares the height of the end (teeth tips) of the bucket 6 calculated by the height calculating part 503 and the position of the target surface shown in guidance data output by the guidance data outputting part 506. The comparison part 504 according to this embodiment compares the height of the position of the center of the teeth tips of the bucket 6 as a "representative position" and the position of the target surface. Furthermore, the comparison part 504 compares the respective heights of the left position and the right position of the teeth tips of the bucket 6 as "positions other than the representative position" and the positions of the target surface corresponding to the left position and the right position, and compares the height of the back surface of the bucket 6 and the position of the target surface.

The comparison part 504 calculates a relative distance to the target surface at the representative position of the bucket 6 and a relative distance to the target surface at the "positions other than the representative position" of the bucket 6. Furthermore, the comparison part 504 calculates the relative angle of the bucket 6 to the target surface. Various data determined in the comparison part 504 are stored in the storage device 47.

The display control part 505 transmits the height of the bucket 6 and the relative distances to the target surface as determined by the comparison part 504 to the display device 40 as work information. The display device 40 displays the work information transmitted from the display control part 505 on the screen. The display device 40 may suitably display a captured image transmitted from the image capturing unit 80. A display screen configuration of the display device 40 is described below. In such cases where the bucket 6 is positioned lower than the target surface, the display control part 505 can display a warning on the display screen of the display device 40 and issue an alarm to the operator through the audio output device 43.

Figure 4:
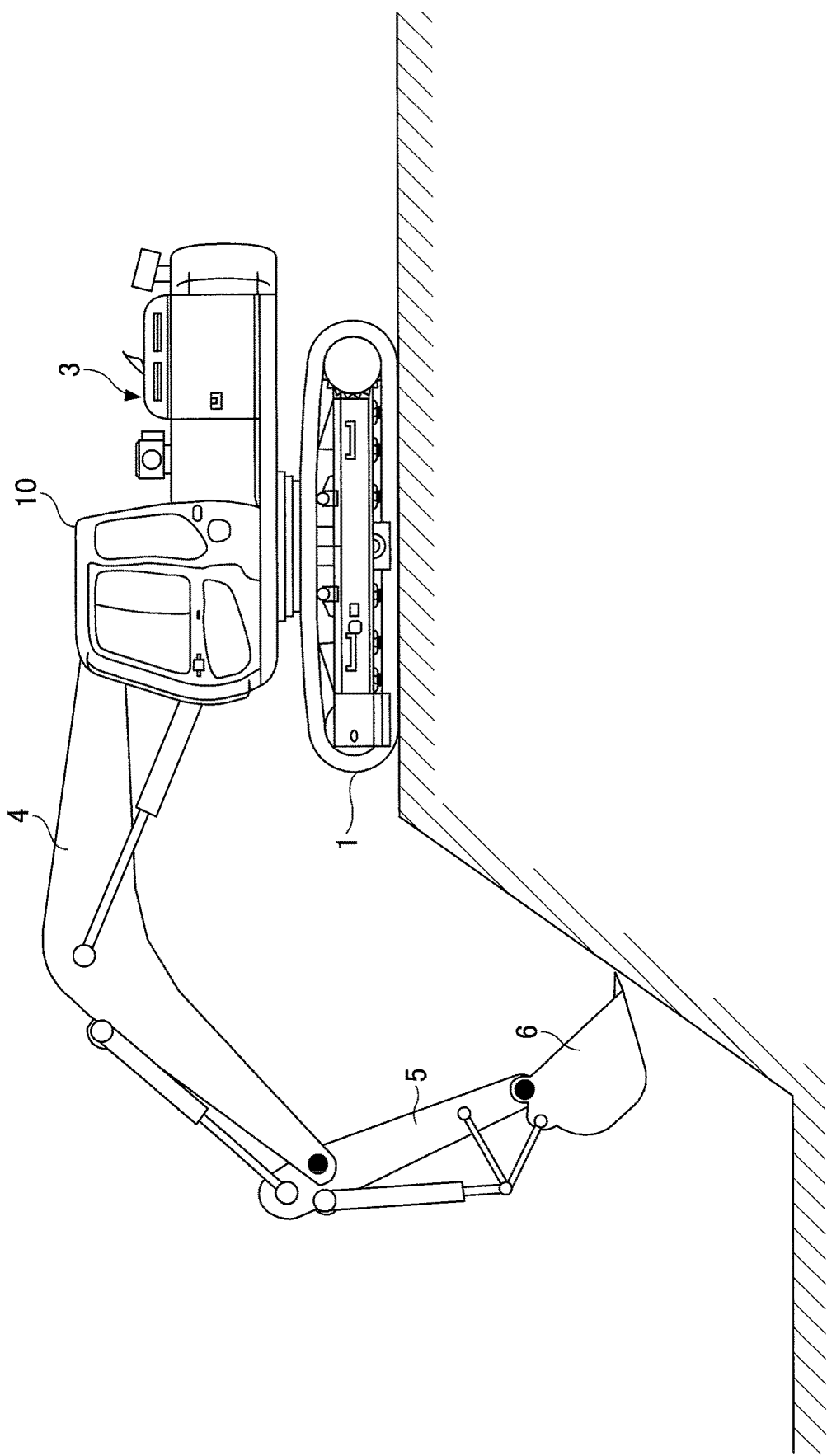
FIG. 4 is a diagram illustrating slope excavating work by the shovel.
Figure 5:
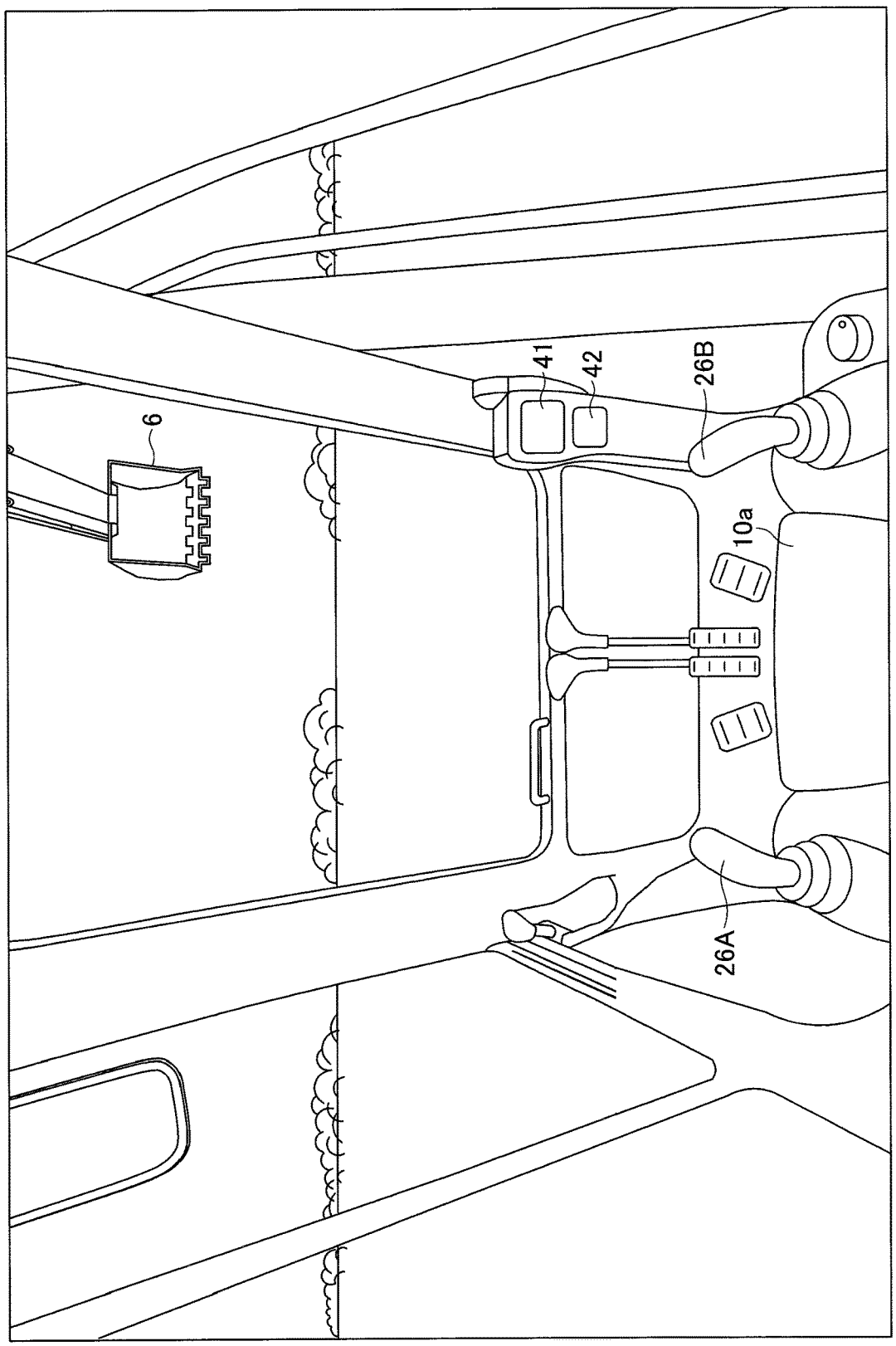
FIG. 5 is a diagram illustrating a forward looking view from an operator seat in a cabin of the shovel.

FIG. 4 is a diagram illustrating the shovel performing the work of excavating a slope (an inclined surface) with the bucket 6 according to the embodiment. FIG. 5 is a diagram illustrating a forward looking view from an operator seat in the cabin 10 of the shovel according to the embodiment.

As illustrated in FIG. 5, the bucket 6 can be seen from the front window of the cabin 10. In the cabin 10, an operator seat 10*a* is provided in the center, and the operating levers 26A and 26B are placed one on each side of the operator seat 10*a*. The operator is seated on the operator seat 10*a* and performs excavation work by moving the bucket 6 to a desired position by operating the operating lever 26A with the left hand and operating the operating lever 26B with the right hand.

The image display part 41 and the switch panel 42 of the display device 40 are placed on the front right of the operator seat 10*a* (on the lower right of the front window). The operator of the shovel operates the operating levers 26A and 26B, etc., with both hands while looking at the bucket 6 outside the window, reading work information from the image display part 41 that comes into sight.

Here, the operator gazes at the bucket 6 outside the window during operations. Therefore, it is difficult for the operator to read the information displayed on the image display part 41 that is in sight.

Therefore, according to this embodiment, the image display part 41 of the display device 40 displays the attitude information of the bucket 6 using a three-dimensional model that makes it possible to perceive width, height, and depth. Such display control is described below.

Next, a display screen configuration of a display screen 600 of the image display part 41 during slope excavating work is described with reference to FIGS. 6, 7A and 7B.

FIG. 6 is a diagram illustrating an example display on the display screen 600 in the case where the bucket 6 is at a position distant from a target surface in slope excavating work. FIGS. 7A and 7B illustrate lists of example displays corresponding to the attitudes (positions) of the upper rotating structure 3 and the bucket 6.

The display screen 600 includes a distance display region 610, a three-dimensional display region 620, and a camera image display region 630, and displays various kinds of work information.

The distance display region 610 includes a graph display part 611 that indicates the distance between the bucket 6 and the target surface.

The graph display part 611 displays the distance from the position of the center of the teeth tips of the bucket 6 as the representative position to the target surface. The graph display part 611 according to this embodiment is a bar graph (bar display) in which display segments 611a are vertically arranged at regular intervals. In the graph display part 611, one of the fifteen display segments 611a is displayed in a color (for example, black) different from that of the other display segments 611a in accordance with the distance from the position of the center of the teeth tips of the bucket 6 to the target surface. The display segment 611a displayed in the different color serves as a bucket position display part (the fourth display part from the top in FIG. 6). The bucket position display part is displayed in such a manner as to vertically move in accordance with the distance from the position of the center of the teeth tips of the bucket 6 to the target surface.

According to this embodiment, the third display segment 611a from the bottom is the position of the target surface. Target indicating parts 611b indicating the position of the target surface are placed one on each lateral side of the third display segment 611a from the bottom.

The three-dimensional display region 620 includes a three-dimensional model 621 that enables three-dimensional visual recognition of the attitude information of the bucket 6. The three-dimensional model 621 is an image having a spherical (circular) outline 621a, and internally includes a transverse plane (horizontal plane) image 622 passing through a center P and a longitudinal plane (vertical plane) image 623 passing through the center P. The transverse plane image 622 includes a center line YP passing through the center P. The longitudinal plane image 623 includes a center line TP passing through the center P. The transverse plane image 622 and the longitudinal plane image 623 are displayed in the positional relationship of crossing each other at right angles.

The transverse plane image 622 turns about the center line YP serving as an axis to display the position (attitude) of the bucket 6. The transverse plane image 622 according to this embodiment displays the relative angle between the back surface of the bucket 6 as a working part and the target surface. That is, the transverse plane image 622 displays the relative angle between the back surface of the bucket 6 and the target surface in a side view of the shovel.

The longitudinal plane image 623 turns about the center line TP serving as an axis to display the attitude of the bucket 6 swung by the upper rotating structure 3. The longitudinal plane image 623 according to this embodiment displays the relative angle of the bucket 6 swung by a swing operation of the upper rotating structure 3 to the target surface. That is, the longitudinal plane image 623 displays the relative angle of the back surface of the bucket 6 to the target surface in a top plan view of the shovel. The transverse plane image 622 and the longitudinal plane image 623 are translucently displayed and are colored. Accordingly, for example, when the transverse plane image 622 turns about the center line YP serving as an axis, the operator can visually recognize a colored surface and therefore can intuitively recognize the attitude of the bucket 6. The same is the case with the longitudinal plane image 623. By thus contrasting the transverse plane image 622 and the longitudinal plane image 623 with other areas within the sphere, it is possible to improve the operator's visual recognition. While FIG. 6 illustrates the case where the colors of the transverse plane image 622 and the longitudinal plane image 623 are different, the colors may be the same.

The center line TP and the center line YP are turned clockwise or counterclockwise about the intersection of the center line TP and the center line YP (the center P), thereby showing the relative angle of the tip line of the bucket 6 serving as a working part to the target surface, that is, showing the relative angle of the tip line of the bucket 6 in a front view of the shovel, which is similar to a view from the operator sitting on the seat of the shovel, to the target surface.

The camera image display region 630 is a region in which a camera image is displayed. According to this embodiment, the shovel includes the image capturing unit 80 (see FIG. 1) for capturing an image of an area other than the field of view of the operator. The image capturing unit 80 transmits a captured camera image to the conversion part 40a of the display device 40. As a result, the operator can visually recognize the camera image captured by the image capturing unit 80 on the display screen 600 of the display device 40. In the camera image display region 630 of the illustrated case, a camera image by the back-side camera 80B is displayed to make it possible to visually recognize a situation on the back side of the shovel including the counterweight 32.

Figure 7A:
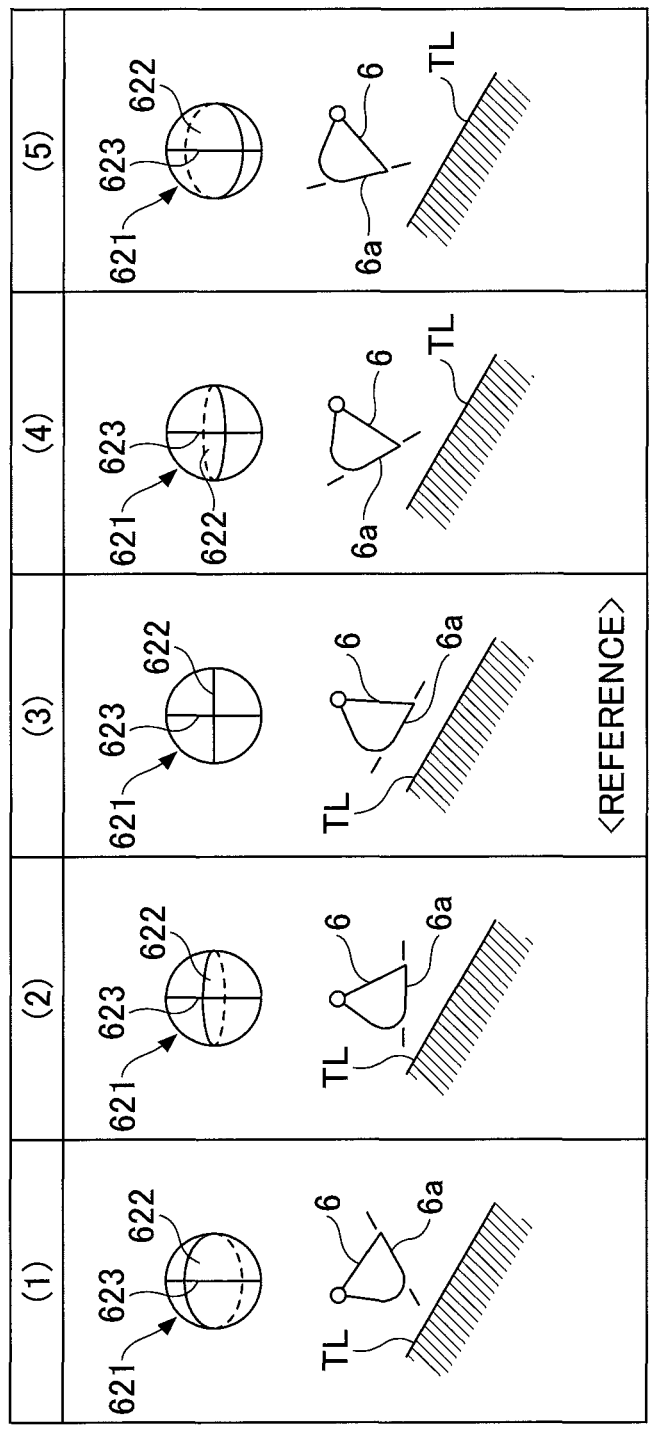
FIG. 7A is a diagram illustrating a list of example displays corresponding to the attitudes of a bucket and an upper rotating structure.

FIG. 7A illustrates a list of example displays of the transverse plane image 622 that represents the relative angle between a back surface 6a of the bucket 6 and a target surface TL. FIG. 7A schematically illustrates the relationship between the target surface TL and the bucket 6 in a side view.

In (3) of FIG. 7A, a reference position (attitude) where the relative angle between the back surface 6a of the bucket 6 and the target surface TL is zero degrees is illustrated. In (2) of FIG. 7A, an example display of the transverse plane image 622 in the case where the bucket 6 is more closed than in (3) of FIG. 7A is illustrated. In (1) of FIG. 7A, an example display of the transverse plane image 622 in the case where the bucket 6 is more closed than in (2) of FIG. 7A is illustrated.

In (4) of FIG. 7A, an example display of the transverse plane image 622 in the case where the bucket 6 is more opened than in (3) of FIG. 7A is illustrated. In (5) of FIG. 7A, an example display of the transverse plane image 622 in the case where the bucket 6 is more opened than in (4) of FIG. 7A is illustrated.

FIG. 7B illustrates a list of example displays of the longitudinal plane image 623 that represents the relative angle of the bucket 6 swung by the swinging of the upper rotating structure 3 to the target surface TL. The longitudinal plane image 623 according to this embodiment represents the relative angle between the longitudinal neutral plane of the bucket 6 swung by the swinging of the upper rotating structure 3 and a vertical plane orthogonal to the target surface TL. The upper rotating structure 3 depicted in FIG. 7B schematically illustrates the relationship between the target surface TL and the upper rotating structure 3 in a top plan view.

In (3) of FIG. 7B, a reference position (attitude) where the relative angle between the upper rotating structure 3 (the bucket 6) and the target surface TL is zero degrees is illustrated. In (2) of FIG. 7B, an example display of the longitudinal plane image 623 in the case where the upper rotating structure 3 is swung leftward from (3) of FIG. 7B is illustrated. In (1) of FIG. 7B, an example display of the longitudinal plane image 623 in the case where the upper rotating structure 3 is swung further leftward from (2) of FIG. 7B is illustrated.

In (4) of FIG. 7B, an example display of the longitudinal plane image 623 in the case where the upper rotating structure 3 is swung rightward from (3) of FIG. 7B is illustrated. In (5) of FIG. 7B, an example display of the longitudinal plane image 623 in the case where the upper rotating structure 3 is swung further rightward from (4) of FIG. 7B is illustrated.

A combination of (4) of FIG. 7A and (4) of FIG. 7B is shown in the three-dimensional display region 620 illustrated in FIG. 6. This, however, is a non-limiting example, and either FIG. 7A or FIG. 7B may be independently displayed in the three-dimensional display region 620.

Figure 8A:
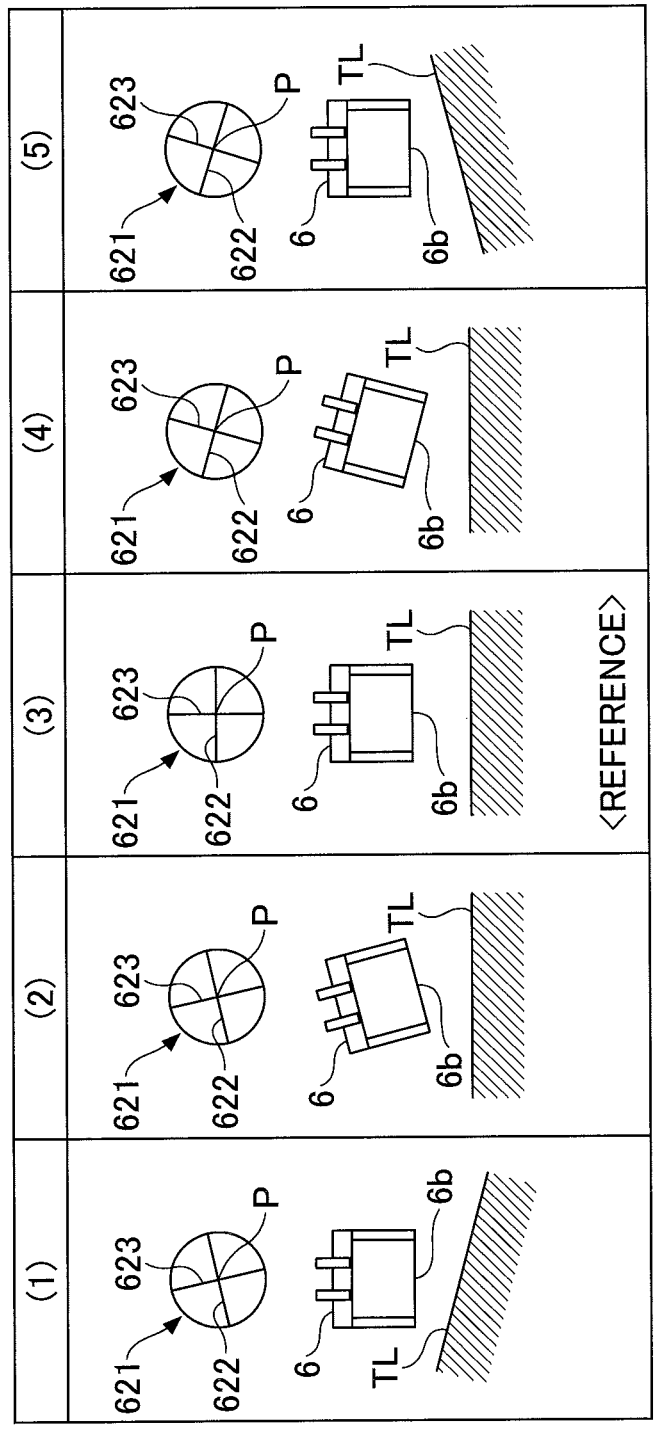
FIG. 8A is a diagram illustrating different example displays on the display screen.

The display illustrated in FIGS. 8A and 8B may be performed in the three-dimensional display region 620 according to this embodiment.

FIG. 8A illustrates a list of different example displays corresponding to the relative angle between a tip line 6b of the bucket 6 and the target surface TL.

The bucket 6 depicted in FIG. 8A schematically illustrates the relationship with the target surface TL in a front view. The three-dimensional model 621 turns clockwise or counterclockwise about the center P in accordance with the relative angle between the tip line 6b of the bucket 6 and the target surface TL. That is, the transverse plane image 622 and the longitudinal plane image 623 turn clockwise or counterclockwise about the center P.

In (3) of FIG. 8A, a reference position (attitude) where the relative angle between the tip line 6b of the bucket 6 and the target surface TL is zero degrees is illustrated. In (2) of FIG. 8A, an example display in the case where the bucket 6 is tilted upward to the right by a bucket tilt mechanism is illustrated. In (1) of FIG. 8A, the display is the same as in (2) of FIG. 8B. In (1) of FIG. 8A, the case where the bucket 6 is not tilted but the relative angle to the target surface TL is the same as in (2) of FIG. 8A is illustrated.

In (4) of FIG. 8A, an example display in the case where the bucket 6 is tilted upward to the left by a bucket tilt mechanism is illustrated. In (5) of FIG. 8A, the display is the same as in (4) of FIG. 8B. In (5) of FIG. 8A, the case where the bucket 6 is not tilted but the relative angle to the target surface TL is the same as in (4) of FIG. 8A is illustrated.

In the three-dimensional display region 620 according to this embodiment, not only the example displays illustrated in FIG. 8A but also the example displays illustrated in FIG. 8B are shown.

FIG. 8B illustrates a list of example displays that display attitude information corresponding to the relative angle between the tip line 6b of the bucket 6 and the target surface TL in combination with the attitude information of the upper rotating structure 3.

The three-dimensional model 621 illustrated in FIG. 8B displays the attitude information of the bucket 6 in combination of the position information of the upper rotating structure 3. The transverse plane image 622 of the three-dimensional model 621 illustrated in FIG. 8B turns clockwise or counterclockwise about the center P to display the relative angle between the tip line 6b of the bucket 6 and the target surface TL. The longitudinal plane image 623 turns clockwise or counterclockwise about the center P to display the relative angle between the tip line 6b of the bucket 6 and the target surface TL. Furthermore, the longitudinal plane image 623 turns about the center line TP to display the relative angle of the bucket 6 swung by the upper rotating structure 3 to the target surface TL. The longitudinal plane image 623 represents the relative angle between the longitudinal neutral plane of the bucket 6 swung by the swinging of the upper rotating structure 3 and a vertical plane orthogonal to the target surface TL.

In (1) of FIG. 8B, a reference position (attitude) where the relative angle between the bucket 6 and the target surface TL is zero degrees is illustrated. In (2) of FIG. 8B, an example display in the case where the upper rotating structure 3 is swung rightward is illustrated. In (3) of FIG. 8B, an example display in the case where the upper rotating structure 3 is further swung rightward from (2) of FIG. 8B is illustrated.

In (4) of FIG. 8B, an example display in the case where the attitude of the bucket 6 illustrated in (3) of FIG. 8B is corrected by tilt correction by a bucket tilt mechanism is illustrated. In (5) of FIG. 8B, an example display in the case where the attitude of the bucket 6 of (4) of FIG. 8B is further corrected by tilt correction is illustrated.

By looking at each display region of the display screen 600, the operator can accurately and intuitively understand the distance from the position of the center of the teeth tips of the bucket 6 to the target surface and the attitude of the bucket 6 relative to the target surface. Furthermore, the tilt direction and the tilt angle of the three-dimensional model can be determined as desired. For example, the tilt of a working part of the end attachment (the teeth tips of the bucket or the like) relative to the target surface may be displayed. Conversely, the inclination of the target surface relative to a working part of the end attachment (the teeth tips of the bucket or the like) may be displayed.

Figure 9:
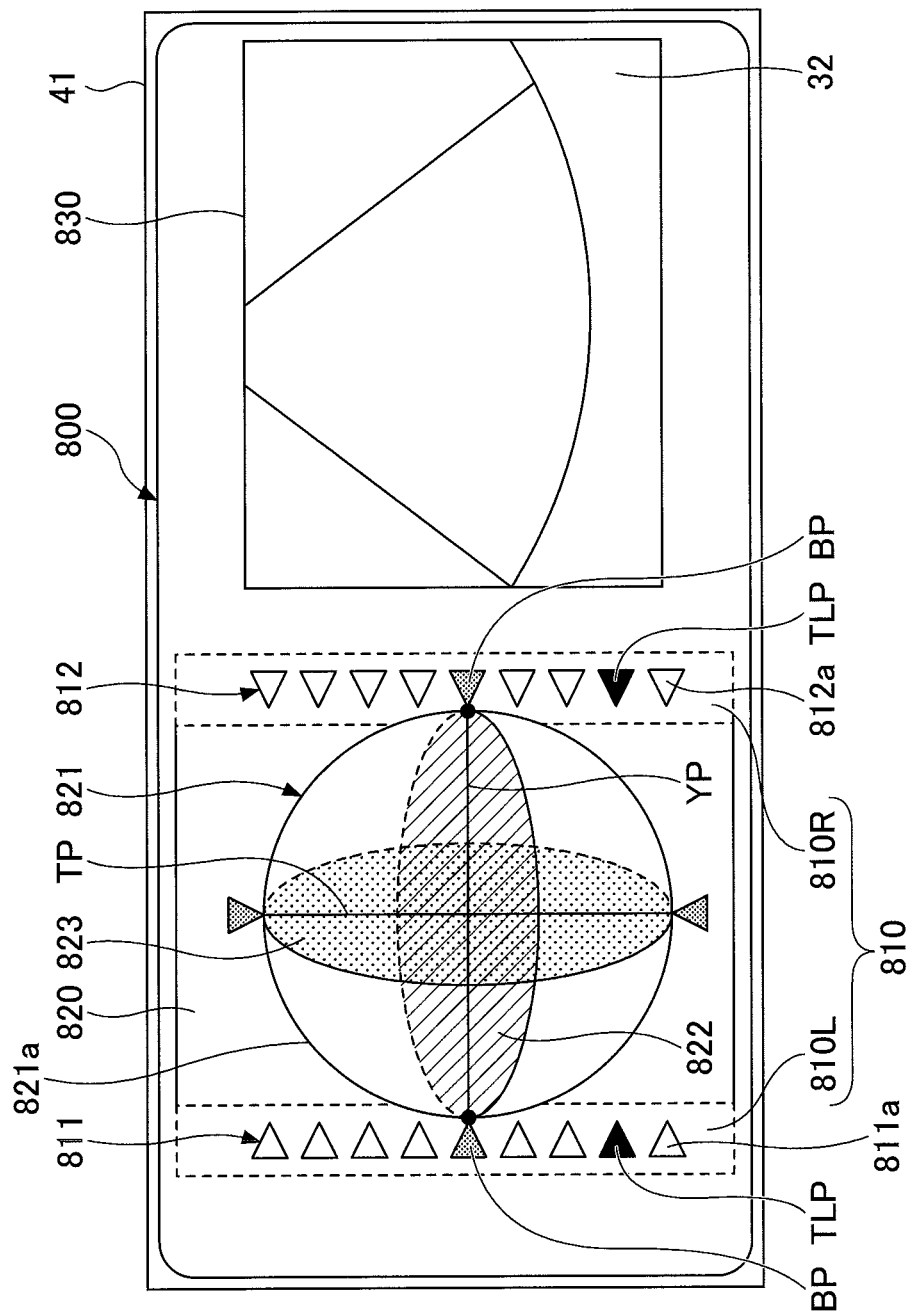
FIG. 9 is a diagram illustrating a different example display of FIG. 6.

Next, a variation of the display screen 600 illustrated in FIG. 6 is described with reference to FIG. 9. FIG. 9 is a diagram illustrating an example display on a display screen 800 in the case where the bucket 6 is at a position distant from a target surface in slope excavating work.

In the following, a description of the same display configuration as in FIG. 6 is omitted, and a description is given mainly of differences.

The display screen 800 includes a distance display region 810, a three-dimensional display region 820, and a camera image display region 830, and displays various kinds of work information. The three-dimensional display region 820 and the camera image display region 830 are the same as the three-dimensional display region 620 and the camera image display region 630 illustrated in FIG. 6, and accordingly, their description is omitted. A three-dimensional model 821 displayed in the three-dimensional display region 820 is the same as the three-dimensional model 621 illustrated in FIG. 6. That is, the three-dimensional model 821 is an image having a spherical (circular) outline 821a, and internally includes a transverse plane (horizontal plane) image 822 passing through a center and a longitudinal plane (vertical plane) image 823 passing through the center. The form of display is the same as in FIGS. 7A, 7B, 8A and 8B.

The distance display region 810 includes display regions placed one on each lateral side of the three-dimensional display region 820. A distance display region 810L is placed on the left side of the three-dimensional model 821. A distance display region 810R is placed on the right side of the three-dimensional model 821.

The distance display region 810L includes a graph display part 811 that indicates the distance between the bucket 6 and the target surface. The distance display region 810R includes a graph display part 812 that indicates the distance between the bucket 6 and the target surface.

The graph display parts 811 and 812 display the distance from the position of the center of the teeth tips of the bucket 6 as the representative position to the target surface. Alternatively, the graph display parts 811 and 812 may display the distances from the left position and the right position of the teeth tips of the bucket 6 as "positions other than the representative position" to corresponding left and right positions on the target surface. In this case, the graph display part 811 indicates the left end of the teeth tips of the bucket 6, and the graph display part 812 indicates the right end of the teeth tips of the bucket 6. The graph display parts 811 and 812 may alternatively display the distance from the back surface of the bucket 6 as "a position other than the representative position" to the target surface. The graph display parts 811 and 812 according to this embodiment are bar graphs in which display segments 811a and 812a are vertically arranged at regular intervals. The display segments 811a and 812a may have a triangular shape and be placed to face each other's vertex. In the graph display parts 811 and 812, one of the nine display segments 811a and one of the nine display segments 812a are displayed in a color (for example, black) different from that of the other display segments 811a and 812a in accordance with the distance from the position of the center of the teeth tips of the bucket 6 to the target surface. The display segments 811a and 812a displayed in the different color serve as a target surface display part TLP (the second display parts from the bottom in FIG. 9). The target surface display part TLP is displayed in such a manner as to vertically move in accordance with the distance from the position of the center of the teeth tips of the bucket 6 to the target surface. Furthermore, the display segments 811a and 812a positioned at the left end and the right end of the three-dimensional model 821 serve as a bucket position display part BP (the fifth display parts from the bottom in FIG. 9). The bucket position display part BP is displayed in a color different from that of the target surface display part TLP, and does not vertically move.

Next, another example of the image displayed on the image display part 41 is described with reference to FIG. 10. FIG. 10 is a diagram illustrating another example of the image displayed on the image display part 41.

The image display part 41 illustrated in FIG. 10 includes a time display part 411, a rotational speed mode display part 412, a traveling mode display part 413, an attachment display part 414, an engine control status display part 415, a remaining aqueous urea solution amount display part 416, a remaining fuel amount display part 417, a coolant water temperature display part 418, an engine operating time display part 419, a captured image display part 460, the distance display region 810, and the three-dimensional display region 820.

The time display part 411 displays a current time. In the illustration of FIG. 10, a current time (10:05) is shown.

The rotational speed mode display part 412 displays a rotational speed mode. In the illustration of FIG. 10, a symbol "SP" representing SP mode is displayed.

The traveling mode display part 413 displays a traveling mode. For example, the traveling mode includes a low-speed mode and a high-speed mode. A "turtle"-shaped mark is displayed in the low-speed mode, and a "rabbit"-shaped mark is displayed in the high-speed mode. In the illustration of FIG. 10, the "turtle"-shaped mark is displayed.

The attachment display part 414 displays, for example, an image representing an attachment that is attached.

The engine control status display part 415 displays the control status of the engine 11. In the illustration of FIG. 10, "automatic deceleration and automatic stop mode" is selected as the control status of the engine 11. The "automatic deceleration and automatic stop mode" means a control status to automatically reduce the engine rotational speed in accordance with the duration of a condition in which the engine load is low and to automatically stop the engine 11 when the condition of the low engine load further continues. Other control statuses of the engine 11 include "automatic deceleration mode," "automatic stop mode," "manual deceleration mode," etc.

In the remaining aqueous urea solution amount display part 416, a bar graph representing the status of the remaining amount of an aqueous urea solution stored in an aqueous urea solution tank is displayed.

In the remaining fuel amount display part 417, a bar graph representing the status of the remaining amount of fuel stored in a fuel tank is displayed.

In the coolant water temperature display part 418, a bar graph representing the temperature condition of engine coolant water is displayed.

The engine operating time display part 419 displays the cumulative operating time of the engine 11. A cumulative operating time since the manufacture of the shovel or a cumulative operating time since the restart of a timer by the operator is displayed in the engine operating time display part 419.

In the captured image display part 460, an image captured by an image capturing device is displayed, and for example, an image captured by a back-side monitoring camera, a left-side monitoring camera, or a right-side monitoring camera is displayed.

In the captured image display part 460, an image capturing device icon 461 representing the orientation of an image capturing device that has captured an image that is being displayed is displayed. The image capturing device icon 461 is composed of a shovel icon 461a representing the shape of the shovel in a plan view and a strip-shaped orientation indicator icon 461b representing the orientation of the image capturing device that has captured the image that is being displayed.

In the illustration of FIG. 10, the orientation indicator icon 461b is displayed below the shovel icon 461a (on the opposite side from the attachment) to indicate that an image of an area behind the shovel captured with the back-side monitoring camera is displayed in the captured image display part 460.

For example, the operator can switch an image to display in the captured image display part 460 to an image captured by another camera by depressing an image switch button provided in the cabin 10.

If the shovel is provided with no image capturing devices, different information may be displayed in place of the captured image display part 460.

The above-described rotational speed mode display part 412, traveling mode display part 413, attachment display part 414, engine control status display part 415, and image capturing device icon 461 constitute a settings display part indicating the settings of the shovel. Furthermore, the remaining aqueous urea solution amount display part 416, the remaining fuel amount display part 417, the coolant water temperature display part 418, and the engine operating time display part 419 constitute an operating condition display part indicating the operating condition of the shovel.

In the distance display region 810 and the three-dimensional display region 820, for example, an image including the graph display parts 811 and 812 indicating the distance between the bucket 6 and the target surface and the three-dimensional model 621 enabling three-dimensional visual recognition of the attitude information of the bucket 6, as described above with reference to FIG. 9, is displayed.

Furthermore, for example, when the shovel is in operation, the image illustrated in FIG. 9 may be displayed in the image display part 41, and when the shovel is not in operation, the image illustrated in FIG. 10 may be displayed in the image display part 41. Whether the shovel is in operation or not may be determined by the controller 30 based on the detection results of the pressure sensors 15*a* and 15*b*, for example.

A shovel according to an embodiment is described above. The present invention, however, is not limited to the above-described embodiment, and variations and modifications may be made without departing from the scope of the present invention.

What is claimed is:

1. A shovel comprising:
   a traveling undercarriage;
   an upper rotating structure swingably mounted on the traveling undercarriage;
   an attachment attached to the upper rotating structure and including a boom, an arm, and an end attachment; and
   a display device configured to display a three-dimensional model that displays attitude information of the end attachment in such a manner as to enable three-dimensional visual recognition of the attitude information relative to a target surface, the three-dimensional model being configured to display a change in a relative angle of the end attachment to the target surface as a change in an area of a plane image of the three-dimensional model.

2. The shovel as claimed in claim 1, wherein a center line is formed in the three-dimensional model.

3. The shovel as claimed in claim 2, wherein the center line is a transverse center line, and the three-dimensional model is configured to turn about the center line serving as a central axis in accordance with the relative angle of the end attachment to the target surface in a side view.

4. The shovel as claimed in claim 2, wherein the center line is a longitudinal center line, and the three-dimensional model is configured to turn about the center line serving as a central axis in accordance with the relative angle of the end attachment to the target surface in a top plan view.

5. The shovel as claimed in claim 2, wherein the three-dimensional model is configured to turn clockwise or counterclockwise in accordance with the relative angle of the end attachment to the target surface in a front view.

6. The shovel as claimed in claim 1, wherein
   the three-dimensional model internally includes a transverse plane passing through a center and a longitudinal plane passing through the center, and
   the transverse plane and the longitudinal plane are translucently displayed and are colored.

7. The shovel as claimed in claim 1, wherein the three-dimensional model has a circular shape.

8. The shovel as claimed in claim 1, wherein a bar representation representing a relationship between a height of a working part and a height of the target surface is displayed together with the three-dimensional model.

9. The shovel as claimed in claim 8, wherein the bar representation includes a plurality of bar representations that are displayed one with respect to each of ends of the working part.

10. The shovel as claimed in claim 9, wherein the bar representations are displayed one on each of opposite sides of the three-dimensional model.

11. The shovel as claimed in claim 1, wherein at least one of the relative angle of the end attachment to the target surface in a side view, the relative angle of the end attachment to the target surface in a top plan view, and the relative angle of the end attachment to the target surface in a front view is displayed in a region adjacent to the three-dimensional model.

12. A display device for a shovel, the shovel including a traveling undercarriage, an upper rotating structure swingably mounted on the traveling undercarriage, and an attachment attached to the upper rotating structure and including a boom, an arm, and an end attachment, wherein:
   the display device is configured to display a three-dimensional model that displays attitude information of the end attachment in such a manner as to enable three-dimensional visual recognition of the attitude information relative to a target surface, the three-dimensional model being configured to display a change in a relative angle of the end attachment to the target surface as a change in an area of a plane image of the three-dimensional model.

* * * * *